3,264,150
EXPLOSIVE LEAD AZIDE PROCESS
James Paterson McNicol Leslie, Stevenston, Scotland, assignor to Imperial Chemical Industries Limited, London, England, a corporation of Great Britain
No Drawing. Filed June 24, 1963, Ser. No. 290,252
Claims priority, application Great Britain, June 28, 1962, 24,941/62
11 Claims. (Cl. 149—35)

This invention relates to lead azide for use as primary initiating explosive in detonators and to processes for its production.

Lead azide for use in detonator primary initiating compositions is prepared by causing sodium azide and a water soluble lead salt to react in aqueous solution and subsequently separating the precipitate of lead azide formed. In order to modify the crystal structure of the lead azide and prevent the formation of sensitive crystals the precipitation is effected in the presence of a colloid. The colloid may be contained in the aqueous solutions of the two reactants but it is the usual practice to first prepare an aqueous solution containing 0.5–1.0 percent by weight of the colloid and to add simultaneously thereto, while the solution is agitated, strong aqueous solutions of the two reactants in approximately stoichiometric ratio. Usually the sodium azide solution is made slightly alkaline with caustic soda and contains a small amount of Rochelle salt as a crystal modifier. The lead azide containing precipitate contains 2 to 5 percent by weight of the colloid; so sufficient colloid solution must be used to provide excess colloid. In this specification the term lead azide includes lead azide treated with minor proportions of other materials to make it suitable for use as a constituent of the initiating explosive in detonators.

Dextrin is the colloid which has hitherto been preferred for the production of lead azide for commercial detonators. The use of gelatin was proposed in U.K. Patent No. 142,898 but did not find commercial application because it resulted in larger crystals than were obtained by the use of dextrin in corresponding conditions and, because of the tendency of the gelatin to froth excessively, it resulted in a rather messy process.

The product precipitated from dextrin has always been found unsuitable for use as the sole constituent of primary initiating charges for detonators due to its inability to bind firmly under the usual loading pressures. As used in detonators it is invariably mixed with a proportion of lead trinitroresorcinate (lead styphnate), this latter ingredient being used mainly, and in the case of electric detonators solely, to impart to the mixture the necessary binding ability or cohesion. The lead trinitroresorcinate, however, is more sensitive to ignition by electrostatic discharge and has a greater tendency to adhere to the press punches than the lead azide constituent of the mixture. This latter disadvantage has been satisfactorily overcome by incorporating into the mixture a proportion of finely divided aluminium powder to act as a lubricant. One currently used mixture contains 68 parts lead azide, 29 parts lead trinitrorosorcinate and 3 parts aluminium, all parts being by weight. This mixture, however, is still more sensitive to ignition by electrostatic discharge than the lead azide constituent thereof.

Clearly it would be advantageous if the lead azide could be prepared in a form which was sufficiently cohesive for use as the sole ingredient of detonator primary initiating explosive, thus rendering unnecessary the inclusion in such compositions of lead trinitroresorcinate.

I have now discovered that lead azide precipitated in the presence of colloid comprising at least a proportion of gelatin treated with a suitable anti-foaming agent has the required degree of cohesion or binding ability for use as the primary initiating charge in detonators.

According to the present invention lead azide suitable for use as primary initiating explosive in detonators is prepared by effecting the formation of a lead azide precipitate in an aqueous solution containing at least 0.4 percent by weight of colloidal material of which at least a portion is gelatin treated with an anti-foaming agent, the gelatine concentration of the solution being at least 0.015 percent by weight. The lead azide precipitate may be formed by mixing together sodium azide and a water soluble lead salt for example lead nitrate. The lead azide precipitate contains 2 to 5 percent of the colloid, 1 to 3 percent lead hydroxide and incidental impurities.

In putting the process of the invention into effect we prefer to prepare an aqueous solution of the colloidal material first and to add thereto simultaneously in stoichiometric proportions strong aqueous solutions of the two reacting salts, the quantity of the total colloid used being at least equal to 5 percent of the weight of the lead azide precipitate formed. The aqueous solution of sodium azide should preferably be made slightly alkaline and contain a small proportion of Rochelle salt as ordinarily employed in lead azide precipitation.

If the colloid solution contains less than 0.4 percent of total colloid material the resulting lead azide may be excessively sensitive to ignition by electrostatic discharges or by impact or friction in presence of grit and may have poor cohesion. Solutions containing more than 1.0 percent colloid are generally rather viscous and are difficult to prepare in quantities required for commercial manufacture. In general it will be found convenient to use solutions containing about 0.75 percent of colloid. Increase in the colloid concentration beyond this value does not result in a commensurate higher proportion of colloid being included in the lead azide composition.

Although the total colloid may, if desired, be gelatin treated with anti-foaming agent we have found that a lead azide composition having satisfactory cohesion characteristics can be prepared using colloid solutions containing only 0.015 percent gelatin the remainder of the colloid being dextrin. It is in general preferable that the gelatin should constitute not more than 60 percent by weight of the total colloid and to include at least 0.3 percent by weight of dextrin in the colloid solution since the use of high proportions of gelatin gives larger crystals of lead azide compositions than are obtained with dextrin. The use of gelatin, however, appears to give products which are less liable to ignition by electrostatic discharge than the corresponding product obtained using dextrin so in certain cases where this hazard is especially important it may be advisable to use only gelatin or to maintain the proportion of gelatin higher than would otherwise be desirable. Where, however, the product is required to be as fine as possible the proportion of dextrin used should be high, the gelatin concentration being just slightly in excess of that required to impart the required binding ability to the product. Solutions containing 0.02–0.05 percent gelatin and 0.5–0.75 percent dextrin have been found satisfactory in these circumstances.

There is some evidence that when the colloid is constituted by a mixture of gelatin and dextrin, gelatin concentrations of about 0.2 to 0.35 percent by weight result in lead azide compositions having relatively poor cohesion characteristics and should preferably be avoided.

The gelatin used should have as high a viscosity as possible, its 12 percent aqueous jelly giving a value of at least 350 grams in the bloom gel rigidity test (British Standard 757 (1959)).

The gelatin may be treated with any of the anti-foaming agents commercially available for this purpose. Only very small quantities of anti-foaming agents are required and excess use of the agent should be avoided in case of possible deleterious side effects on the crystal form. We have found, for example, that 10 parts per million of n-octyl alcohol in the aqueous colloid solution is sufficient. The anti-foaming agent may be added to the aqueous solution of the colloid but it is generally more convenient to use a commercial gelatine preparation in which the anti-foaming agent has been incorporated during manufacture. It is also generally advantageous to include in the gelatin a small proportion of a preservative material such as phenol or a phenolic derivative for example O-phenylphenol or its sodium salt.

Although the lead azide of the invention is suitable for use as primary initiating explosives by itself, minor proportions of other ingredients insufficient to destroy the binding characteristics may if desired be included within such explosives. Thus, for example, it may be advantageous to include some finely divided aluminum to prevent particles of the explosive adhering to the press punches when the charge is pressed into the detonator. The inclusion of aluminum also appears to improve the cohesion of the initiating explosive.

The invention is further illustrated by the following examples in which all parts are by weight.

EXAMPLES 1–23

In these examples 50 cc. of each of two solutions, one containing 383 grams/liter of lead nitrate and the other containing 150 grams sodium azide, 0.57 gram Rochelle salt and 1.2 grams caustic soda per liter, were run simultaneously at a uniform rate into 337 cc. of an aqueous colloid solution over a period of 32 minutes. The resulting precipitate containing lead azide was separated off, washed with water, dried in air at 50–60° C. and subjected to the following tests:

*Cohesion.*—In this test 0.2 gram test charges of the lead azide composition were pressed at 4500 p.s.i. into metal detonator tubes on top of 0.3 gram charges of pentaerythritoltetranitrate (PETN) and 30 of such charged tubes were placed in a drum which was revolved about a horizontal axis at 30 revolutions per minute. The time required for observable defects to develop on the surface of half the charges was noted and taken as a measure of cohesion. A time of less than 30 minutes is considered unsatisfactory.

*Grit sensitivity.*—In this test a quantity of the lead azide composition under test was mixed with about 5 percent of its weight of standard sand, a 5 milligram sample of the mixture was placed on a steel anvil and a steel roller was placed on the sample.

An 8.3 gram steel ball was then dropped from various heights, 20 tests being made from each height and the height observed at which half of the tests resulted in ignitions. The results are recorded as gram centimeters i.e. the height multiplied by the weight. A value less than 25 gram-centimeters is undesirable.

*Sensitivity to electrostatic discharge (static sensitivity).*—A condenser of about 330 micromicrofarad capacity was charged to various voltages and discharged through test samples loosely loaded around an electric fusehead crimped into detonator tubes. The minimum voltage for ignition in 20 tests was determined. A value in excess of 3000 volts is desirable.

*Crystal size.*—The size of the largest crystals in a test sample was determined with a microscope. Crystals larger than 200 microns are generally undesirable since modified charging techniques may be required to load them into detonators.

*Bulk density.*—This was determined for a 2.2 gram sample loaded with gentle tapping to a cylindrical tube having a diameter of one centimeter. High bulk density is desirable.

Colloid solutions containing various amounts of dextrine and gelatin were used in the examples and the respective concentrations of these ingredients are given in Tables 1 and 2.

The gelatin used was non-foaming gelatin (NF gelatin) which gave a value of 350 grams when its 12 percent aqueous jelly was tested in the bloom gel rigidity test (British Standard 757 (1959)). It contained approximately 10 parts per million of n-octyl alcohol as antifoaming agent and a similar quantity of sodium O-phenylphenate as preservative.

The results obtained on lead azide compositions prepared using gelatin without dextrin in Examples 1–12, are set forth in Table 1. For comparison the results of the same tests on the mixture of lead azide prepared in the absence of a colloid are included as Example 1. It will be noted that the lead azide of Example 1 had good cohesion but had a large crystal size, low bulk density and was very sensitive to both electrostatic discharges and to impact when mixed with grit. The progressive addition of gelatin to the colloid solution in Examples 2–12 at first reduced the cohesion until a minimum value was obtained at about 0.2 percent concentration but this property was restored at higher concentrations. The sensitivity to electrostatic discharge and the grit sensitivity also progressively and rapidly improved. However, although the crystal size became somewhat lower it was not sufficiently low to be generally acceptable in manufacture where a maximum crystal size of 130 microns is desirable. None of the products of Examples 1 to 12 would meet all requirements but the products of Examples 7 to 12 have exceptionally good cohesion and low sensitivity both to electrostatic discharge and to impact when contaminated with grit and would be useful where these properties are of paramount importance and a crystal size of up to 200 microns could be tolerated.

*Table 1*

| Example | Colloid solution—NF Gelatin (percent) | Cohesion (minutes) | Grit Sensitivity (gram-cm.) | Static Sensitivity (Kilovolts) | Largest Crystal Size in microns | Bulk Density (g./cc.) |
|---|---|---|---|---|---|---|
| 1 | 0 | >60 | 11 | 1.5–2 | 330 | 1.4 |
| 2 | 0.02 | >60 | 16 | ------ | 330 | 1.4 |
| 3 | 0.05 | >60 | 23 | 5–7 | 330 | 1.4 |
| 4 | 0.10 | 40–50 | 25 | 7–10 | 200 | 1.6 |
| 5 | 0.20 | 0–10 | 62 | 7–10 | 260 | 1.8 |
| 6 | 0.3 | 0–10 | >80 | ------ | ------ | 1.7 |
| 7 | 0.40 | >60 | 77 | 25–30 | 170 | 1.6 |
| 8 | 0.6 | 120–140 | >80 | 25–30 | ------ | 1.5 |
| 9 | 0.7 | >120 | >80 | >30 | 150 | 1.4 |
| 10 | 0.80 | >60 | >100 | >30 | 150 | 1.4 |
| 11 | 0.9 | >60 | >80 | >30 | ------ | 1.4 |
| 12 | 1.0 | >240 | >100 | >30 | 200 | 1.4 |

In Examples 10–18 (Table 2) lead azide was prepared using colloid solutions containing both dextrin and non-foaming gelatin, the concentration of these ingredients being varied as indicated. The results obtained on testing the lead azide product are set forth in Table 2. For comparison the results obtained on lead azide prepared with 0.75 percent dextrin are given under Example 13 and those on initiating composition containing 68 parts lead azide composition of Example 9, 29 parts lead trinitroresorcinate and 3 parts aluminum (ASA composition) are included as Example 23. It was apparent from the results obtained that the composition of Example 16 prepared using only 0.02 percent of gelatin had satisfactory cohesion and was markedly less sensitive to electrostatic discharge than either the ASA composition or the composition of Example 13 prepared without gelatin. The crystal size of the product of Example 16 was also satisfactory and the bulk density was similar to that of the ASA composition.

It was again apparent from Example 19 that initial concentration of gelatin of about 0.25 percent gave a product which had poor cohesion so that gelatin concentrations of about 0.2 to 0.35 should be avoided.

minimum charge for initiation of PETN was about 0.06 gram.

EXAMPLE 25

In this example a lead azide was prepared under manufacturing conditions using a colloid solution containing 0.7 percent of gelatin as in Example 9. The gelatin was the same as that used in Example 24 and the lead azide precipitate was prepared as described in that example.

The lead azide gave the following results:

Cohesion, minutes _____ >120
Grit sensitivity, gram-cm. _____ >80
Sensitivity to electrostatic discharge, kilovolts ___ >30
Largest crystal size, microns _____ 150
Bulk density, g./cc. _____ 1.4
Lead azide content, percent _____ 93.5

The minimum charge for PETN base charge initiation was 0.03 gram.

What I claim is:

1. In the process of manufacturing lead azide for use

Table 2

| | Colloid Solution | | Cohesion (minutes) | Grit Sensitivity (gram-cm.) | Static Sensitivity (Kilovolts) | Largest crystal size in microns | Bulk Density (g./cc.) |
|---|---|---|---|---|---|---|---|
| | NF Gelatin (percent) | Dextrin (percent) | | | | | |
| 13 | 0 | 0.75 | 0-10 | 30-50 | 3-4 | 110 | 2.2 |
| 14 | 0.002 | 0.75 | 0-10 | 33 | | 120 | |
| 15 | 0.01 | 0.75 | 10-20 | 43 | | 130 | 2.0 |
| 16 | 0.02 | 0.75 | >30 | 50 | 5-7 | 130 | 1.6 |
| 17 | 0.15 | 0.75 | >30 | 47 | | 130 | |
| 18 | 0.2 | 0.5 | 30-40 | | | | |
| 19 | 0.25 | 0.5 | 0-10 | 100 | 15-20 | 230 | 1.8 |
| 20 | 0.45 | 0.3 | >30 | 72 | 15-20 | 170 | 1.52 |
| 21 | 0.3 | 0.2 | >30 | 82 | 15-20 | 310 | 1.38 |
| 22 | 0.015 | 0.3 | 20-30 | 41 | 2-3 | 190 | 2.0 |
| 23 | A.S.A. composition | | 40-50 | 30-50 | 1-1.5 | 110 | 1.5-1.7 |

EXAMPLE 24

In this example a lead azide was prepared under manufacturing conditions using the colloid solution concentrations of Example 16. A commercially available non-foaming gelatin of 350 bloom test was first prepared as a 20 percent gelled slab. 36 liters of a dextrin solution containing 45 grams dextrin per liter were added to 180 liters of water and the solution heated to 60° C., the solution being stirred throughout. 216 grams of the prepared 20 percent gelatin were added and dissolution occurred rapidly. While stirring was continued 32 liters of a solution containing 150 grams sodium azide, 0.57 gram Rochelle salt and 1.2 grams caustic soda per liter and 32 liters of a solution containing 383 grams/liter of lead nitrate were added simultaneously at uniform rates over a period of one hour.

The resulting precipitate of lead azide gave the following test results:

Cohesion, minutes _____ >60
Grit sensitivity, gram-cm. _____ 40
Sensitivity to electrostatic discharge, kilovolts ___ 5-7
Largest crystal size, microns _____ 130
Bulk density, g./cc. _____ 1.7
Lead azide content, percent _____ 94.8

Detonators each containing a base charge 0.24 gram of PETN pressed at 400 p.s.i. and primary charges of 0.15 gram of the lead azide composition of this example pressed at 4000 p.s.i. were prepared and tested by firing with a commercial electric fusehead. Of 500 detonators tested all fired satisfactorily.

For satisfactory initiation of PETN detonator base charges the minimum primary charge which could be used was about 0.03 gram of the lead azide product of this example. In this respect it was markedly superior to the ASA composition of Example 23 of which the as a primary initiating explosive in a detonator by precipitating lead azide from an aqueous solution containing a water-soluble azide and a water-soluble lead salt the improvement which comprises providing in said aqueous solution at least 0.4 percent by weight of collodial material of which at least a portion is gelatin treated with an anti-foaming agent, the material being present in an amount sufficient to provide at least 0.015 by weight percent gelatin in said solution.

2. The process of claim 1 in which the gelatin has a viscosity in its 12% aqueous jelly of at least 350 grams in the bloom gel rigidity test.

3. The process of claim 1 in which the water-soluble azide is an alkali metal azide.

4. The preparation of a lead azide of improved resistance and reduced sensitivity to electrostatic discharge by a process in accordance with claim 1 wherein at least 60 percent by weight of the colloidal material is gelatin.

5. A process as claimed in claim 1 wherein the anti-foaming agent is N-octyl alcohol.

6. A process as claimed in claim 1 wherein the gelatin contains a small proportion of a preservative material.

7. A process as in claim 1 wherein said water-soluble azide is sodium azide.

8. A process as in claim 1 wherein an aqueous solution of said colloidal material is prepared and wherein strong aqueous solutions of said water-soluble azide and said water-soluble lead salt are added simultaneously in stoichiometric proportions to said aqueous solution of colloidal material, the quantity of the total colloid being employed being at least equal to 5 percent by weight of the lead azide precipitate formed.

9. A process as in claim 8 wherein the water-soluble azide is sodium azide and wherein the strong aqueous solution thereof is alkaline and contains a small proportion of Rochelle salt.

10. A process as in claim 8 wherein the colloidal material comprises a mixture of gelatin and dextrin, the gelatin constituent being not more than 60 percent by weight of the total colloid and the dextrin concentration in the colloid solution being at least 0.3 percent by weight.

11. A process as in claim 10 wherein the colloid solution contains 0.02–0.05 percent by weight of gelatin and 0.5–0.75 percent by weight of dextrin.

References Cited by the Examiner

UNITED STATES PATENTS

| | | | |
|---|---|---|---|
| 2,373,800 | 4/1945 | Acken et al. | 23—101 |
| 2,421,778 | 6/1947 | Fleischer et al. | 149—35 X |
| 2,965,466 | 12/1960 | Ball | 149—35 |
| 2,989,389 | 6/1961 | Prior et al. | 149—35 |
| 3,095,268 | 6/1963 | Bostrom et al. | 149—35 X |
| 3,173,818 | 3/1965 | Holloway et al. | 149—35 |

FOREIGN PATENTS 142,898    5/1920    Great Britain.

BENJAMIN R. PADGETT, *Primary Examiner.*

CARL D. QUARFORTH, LEON D. ROSDOL,
*Examiners.*

W. T. HOUGH, A. G. BOWEN, L. A. SEBASTIAN,
*Assistant Examiners.*